(12) United States Patent
Martin

(10) Patent No.: US 9,573,068 B1
(45) Date of Patent: Feb. 21, 2017

(54) VIRTUAL REALITY ENHANCEMENT DEVICE

(71) Applicant: Kipling Martin, Arvada, CO (US)

(72) Inventor: Kipling Martin, Arvada, CO (US)

( * ) Notice: Subject to any disclaimer, the term of this patent is extended or adjusted under 35 U.S.C. 154(b) by 0 days.

(21) Appl. No.: 15/090,449

(22) Filed: Apr. 4, 2016

(51) Int. Cl.
*A63G 31/16* (2006.01)

(52) U.S. Cl.
CPC .................... *A63G 31/16* (2013.01)

(58) Field of Classification Search
CPC ...... A63G 31/00; A63G 31/007; A63G 31/16; A63H 23/10; A63B 69/0093; A63B 2208/03; A63B 67/007
USPC ........ 472/59–60, 67, 82, 128, 130; 434/254; 482/55
See application file for complete search history.

(56) References Cited

U.S. PATENT DOCUMENTS

| | | | |
|---|---|---|---|
| 2,344,454 A * | 3/1944 | Plotner | G09B 9/12 434/55 |
| 3,543,516 A * | 12/1970 | Treichel | F15B 13/022 137/87.03 |
| 4,427,385 A * | 1/1984 | Galerne | G09B 9/00 405/185 |
| 4,487,410 A | 12/1984 | Sassak | |
| 4,710,129 A | 12/1987 | Newman et al. | |
| 5,219,315 A | 6/1993 | Fuller et al. | |
| 5,429,140 A | 7/1995 | Burdea et al. | |
| 5,490,784 A | 2/1996 | Carmein | |
| 5,616,083 A * | 4/1997 | Subbaraman | A63G 31/007 366/314 |
| 5,655,909 A | 8/1997 | Kitchen et al. | |
| 5,846,134 A * | 12/1998 | Latypov | A63B 19/04 434/307 R |
| 6,270,414 B2 * | 8/2001 | Roelofs | 345/156 |
| 6,425,764 B1 | 7/2002 | Lamson | |
| 6,563,489 B1 * | 5/2003 | Latypov | G06F 3/011 345/156 |
| 8,009,022 B2 | 8/2011 | Kipman et al. | |
| 8,487,749 B2 | 7/2013 | Borrel et al. | |
| 2008/0026838 A1 | 1/2008 | Dunstan et al. | |

FOREIGN PATENT DOCUMENTS

| | | |
|---|---|---|
| DE | 19637884 | 4/1998 |
| WO | 2004012141 | 2/2004 |

OTHER PUBLICATIONS http://hight3ch.com/discover-sensory-deprivation-chambers/.
https://en.wikipedia.org/wiki/Haptic_suit.
https://forums.oculus.com/viewtopic.php?t=2693.
http://somniacs.co/.

* cited by examiner

*Primary Examiner* — Kien Nguyen
(74) *Attorney, Agent, or Firm* — Scott D. Swanson; Shaver & Swanson, LLP

(57) ABSTRACT

What is disclosed is a virtual reality enhancement device that has a chamber in which a user is located, one or more pumps for pumping a fluid into and/or out of the chamber, and a series of ports for allowing the fluid to flow into and out of the chamber. The fluid circulates into and out of the chamber around the user in coordination with the 3-D visual and auditory experience provided to the user in order to enhance the user's haptic experience. The chamber can be used, for example, to simulate a user swimming or flying.

20 Claims, 9 Drawing Sheets

VIRTUAL REALITY ENHANCEMENT DEVICE

TECHNICAL FIELD

The presently disclosed technology relates to devices for improving the virtual reality experience of a user through haptic interaction.

BACKGROUND

Various attempts have been made to enhance a virtual reality or three dimensional (3D) experience of user. For example, U.S. Pat. No. 5,490,784 provides a motion simulating device with up to 6 degrees of freedom. The motion simulating device appears to provide for feeling that the user is in either land based or aeronautical vehicle.

U.S. Pat. No. 8,487,749 provides a cylindrical chamber with a cylindrical pin casing and retractable pins lining the chamber. This allows the user to interact with the pins by pushing on the pins. The pins provide haptic feedback to the user in coordination with a 3D immersive environment. Several non-patented, from what the inventor has found, attempts have also been made to enhance the haptic experience of user. For example, a device at somniacs.co under the Trademark name of Birdly® provides a 3D interactive haptic experience that simulates that a user is flying. The device utilizes a fan position on the front of a device in which a user lays with the user's hands spread apart, similar to if a person was positioned horizontally and using the persons arms as wings. However, none of the devices that the user knows of have been used to simulate swimming or immersion into a fluid environment. Similarly, the user does not know of any fluid haptic devices that can be utilized to enhance sensory interaction between a user and a 3D environment via the temperature interface between the user and a fluid.

U.S. Pat. No. 5,219,315 utilizes a fluid based simulator to simulate rapids or waves. This allows the simulation device to simulate a river or other body of water including waves or rapids such as to simulate a white water rafting experience.

What is needed is a device and method to enhance a user's haptic 3-D experience and to provide an improved interactive 3-D experience to simulate flying or swimming in order to maximize a user's 3-D experience.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a virtual reality enhancement device configured to implement actual physical applications so as to simulate a 3-D environments in conjunction with a 3-D ocular device. The virtual reality enhancement device comprising has a sealable or closable opening or lid for human ingress and egress. The chamber is configured to be fluid-tight when the closable opening is closed such that fluid pumped into and out of the chamber is not able to spill from the lid or chamber. The chamber in essence allows fluid to be circulated or pumped through the chamber to simulate that a user is swimming, flying, or to otherwise provide for haptic sensation. In a preferred embodiment the user is suspended in a harness or other supporting device that is preferably attached to the chamber. The harness allows a user to remain suspended without floating to the top or sinking to the bottom of the chamber. The chamber can be presented in a variety of sizes and shapes in order to fulfill the inventive concepts disclosed herein.

The chamber in a preferred embodiment has at least one port configured for fluid inflow and at least one port configured for fluid outflow. In a preferred embodiment the chamber is a generally rectangular box having the dimensions of approximately eleven (11) feet in height, approximately seven (7) feet in width, and approximately 7 feet in depth. In a preferred embodiment the chamber has multiple ports on each interior wall in order to provide a variety of flow directions of fluid within the chamber by altering the inflow and outflow of fluid through the ports. Utilizing multiple ports and altering the inflow and outflow of each allows the directional flow along a three dimensional axis, or the x, y, and z axes to provide simulation of flow in virtually any direction.

The device has at least one pump that is configured to pump a fluid into the chamber, and preferably into and out of the chamber. This can operate to circulate water into the chamber and out of the chamber or it can be utilized to pump fresh fluid into the chamber. In a preferred embodiment, the fluid is a water composition, meaning the base fluid is water along with any other substances in the water, such as salt.

In a preferred embodiment the ocular device is configured for providing a user with a 3-D interactive optical environment. An example of an ocular device that can be used with the system is the Oculus Rift, but configured preferably to be water tight on a user so as to prevent fluid from the chamber from leaking into the ocular device. The ocular device can be provided as a mask that can include an integrated breathing air supply or the ocular device and the breathing apparatus can be provided as separate devices. The breathing apparatus can be configured to provide an increased amount of oxygen than from what is considered environmental air (in other words typical environmental air) such as a lower oxygen content to simulate a user being at a higher altitude or an increased oxygen level to provide a user with an increased feeling of euphoria that is commonly felt from breathing a high concentration of oxygen. Various substances can be added to the breathing mechanism to increase a user's experience from an olfactory sense. These substances could include smells, vaporized mood enhancing substances, or 3-D experience enhancing substances that simulate the environmental conditions that the user is in. In a preferred embodiment the user is supplied with a mechanism for providing audio stimulation to the user. This can include headphones incorporated with an ocular mask or separate from the ocular mask. The ocular mask and auditory input mechanism can be incorporated in the same structure as the breathing and olfactory providing mechanism, or as separate devices. The chamber can further include sensors to determine if a user needs to be removed from the system (such as heart rate sensors) and breathing sensors to monitor the user to ensure the user is having a safe experience.

In a preferred embodiment the device includes a processor that is configured for coordinating the operation of the 3-D optical environment provided through the ocular device along with the pump to provide a user with an interactive 3-D haptic experience. In a preferred embodiment the processor will coordinate the flow of the fluid with the ocular, auditory, and/olfactory feeds to simulate a full experience to the user. For example, the pump (or a series or plurality of pumps) will be able to pump water in a single direction, such as in from the top of the chamber and out the bottom of the chamber, to simulate a current flowing in the chamber. If the chamber is laid on its side, the current would simulate swimming in a river or a similar current. The ports into and out of the chamber can also be called "jets" similar to jets in a lap swimming pool or a hot tub. The processor serves to coordinate the interaction between the 3-D visual, auditory, and olfactory environment that the user is experiencing with the flow of the fluid into and out of the chamber, along with the temperature of the fluid flowing into and/or out of the chamber. Different individual water inputs can be set at different temperatures to provide a different haptic sensation in coordination with the overall 3-D experience.

The virtual reality enhancement device can also include a heater and/or cooler for heating and/or cooling the fluid that is entering and exiting the device. This function can be provided integrally with the pump. Alternatively individual fluid feeds to individual jets can be configured to provide varying temperature of fluid to provide different temperatures in the haptic experience. In a preferred embodiment the system has one or more sensors that sense the movements of the user's body and coordinate these movements with the 3-D interactive environment that is being provided to the user. This can include a body suit worn by the user that has sensors connected (either via wires or wirelessly) to the processor to provide user movement feedback to the processor.

The disclosed inventive concept(s) also include a method of producing an interactive 3-D interface facilitating a user to implement actual physical applications so as to simulate 3-D environments in conjunction with a haptic device. The method involves a series of steps, including the step of providing a chamber filled with a fluid, which in a preferred embodiment is water. The chamber is configured such for a human is able to be fully immersed within the chamber in the fluid. The chamber can be provided in a variety of shapes, including but not limited to a rectangular box, a sphere, a cylindrical chamber, and a square box. In a preferred embodiment the rectangular box chamber rectangular box is approximately 11 feet in height, approximately 7 feet wide, and approximately 7 feet in depth.

The chamber has at least one fluid inflow port, preferably multiple fluid inflow ports, and at least one fluid outflow port, preferably multiple fluid outflow ports. The fluid inflow port and fluid outflow port are in fluid connection with one or more pumps configured for pumping fluid into and out of said chamber via the fluid inflow port and said fluid outflow port. This allows for water to be circulated in the system from the pump to the chamber and back to the pump. Preferably numerous inflow and outflow ports (ideally which can each function as an inflow and outflow port) are positioned such that a user within the chamber is surrounded by ports. This leads to a wide range of flow currents that can be applied within the chamber.

The disclosed method includes the step of positioning a user within said chamber and the step of providing said user with an interactive virtual reality environment. The user can be provided with the interactive virtual reality environment through an optical or ocular device such as the Oculus Rift. Alternatively the use of an in-chamber presentation of a 3-D interactive environment could be utilized, such as by a hologram generating machine. The method includes the step of sealing or closing the entry point into the chamber to make the chamber water-tight to allow for fluid circulation to provide the user with the feeling of flowing water or air.

The disclosed method includes in the step of manipulating the fluid inflow and outflow within said chamber so as to change the fluid flow within said chamber to correspond with the 3-D environment presented to said user in said chamber. This step can be performed by a processor configured to manipulate the fluid flow in accordance with the 3-D environment presented to the user. Similarly, the processor can be used to manipulate the 3-D environment presented to the user and/or the fluid flow in the chamber in conjunction with the user's movements.

The method in a preferred embodiment includes providing a virtual reality capable headset to said user for presentation to the user of the 3-D virtual environment. The headset includes a mechanism, such as a screen, for displaying an interactive 3-D environment to said user. The headset can be configured to provide a source of oxygen for said user to utilize for breathing to the user. Alternatively the source of oxygen could be a separate breathing tube. The oxygen (or breathing air) source can be configured such that virtual reality enhancement substances can be added to the oxygen or air supply to enhance said user's virtual reality experience. Examples of virtual reality enhancement substances include mood enhancement drugs, olfactory enhancement additions such as smells, or increasing or decreasing the oxygen percentage in the air supply to provide the user with the perception of being at higher altitude or to make a user feel an increased sense of euphoria as is felt when breathing a high percentage of oxygen.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
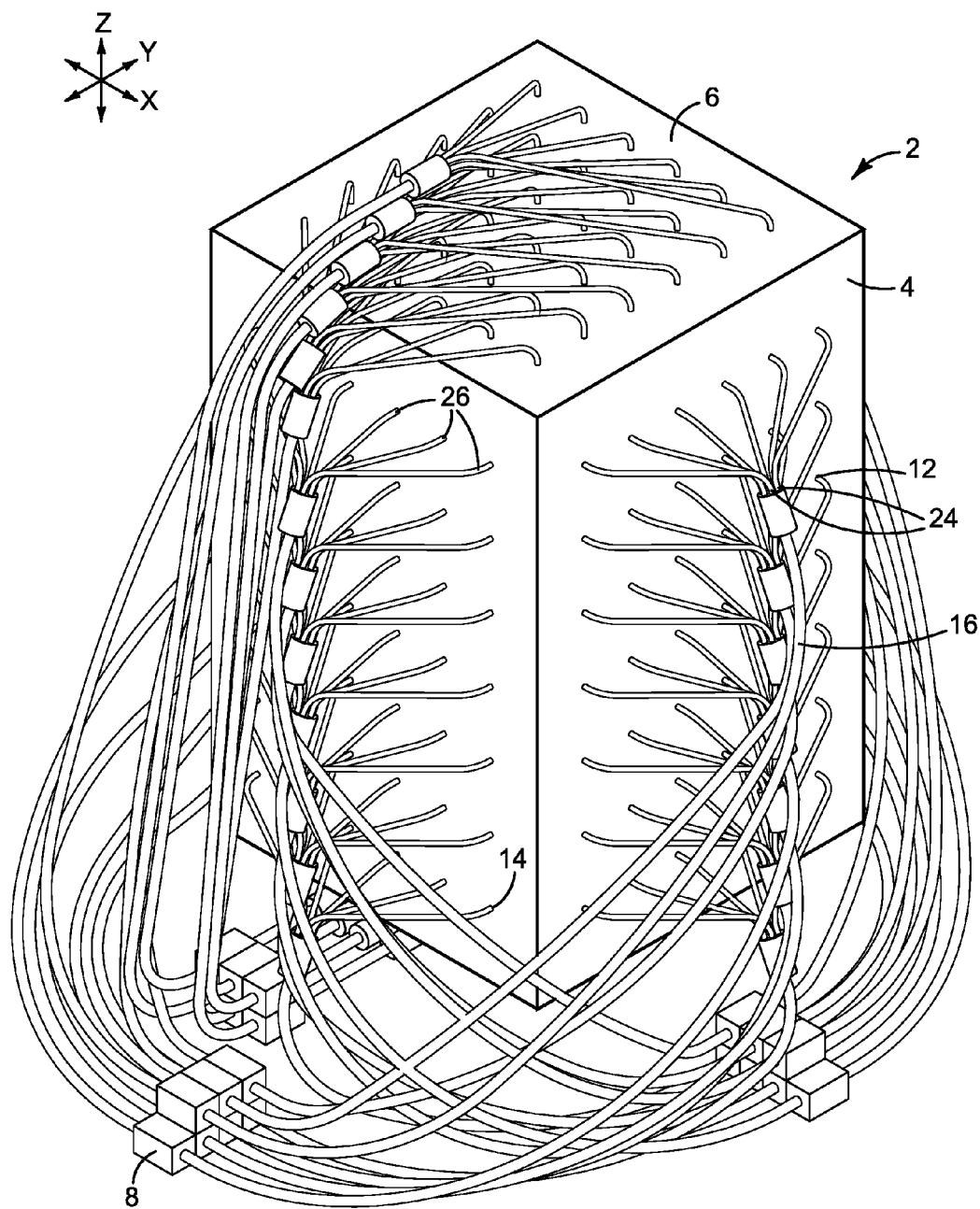
FIG. 1 is an isometric view of an embodiment of the invention chamber of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a preferred embodiment of the Virtual Reality Enhancement Device. The Virtual Reality Enhancement Device 2 is made up of chamber 4. Chamber 4 has an opening for ingress and egress (not shown) that is sealable by panel or lid 6. The method of ingress or egress in or out of the chamber can be configured in a variety of embodiments including entire panels that open and close, or smaller portions of panels or exterior wall that open and close. In the depicted embodiment the chamber is in a rectangular shape, however, it is thought that the chamber can be constructed in a variety of shapes including square, rectangular, or spherical. The chamber has ports 12, 14 for the inflow and outflow of a fluid. In a preferred embodiment it is such that the fluid within the chamber would be water. The pump 8 is configured to pump fluid into and out of the chamber via tubing 24, 26. Tubing 24, 26 can originate from a single tube 16 from the pump or there can be a plurality of origination points for further micro control of the flow of water. The pump circulates or provides inflow and outflow of fluid in order to provide varying current and thus varying haptic experience for a user within the chamber.

Figure 2:
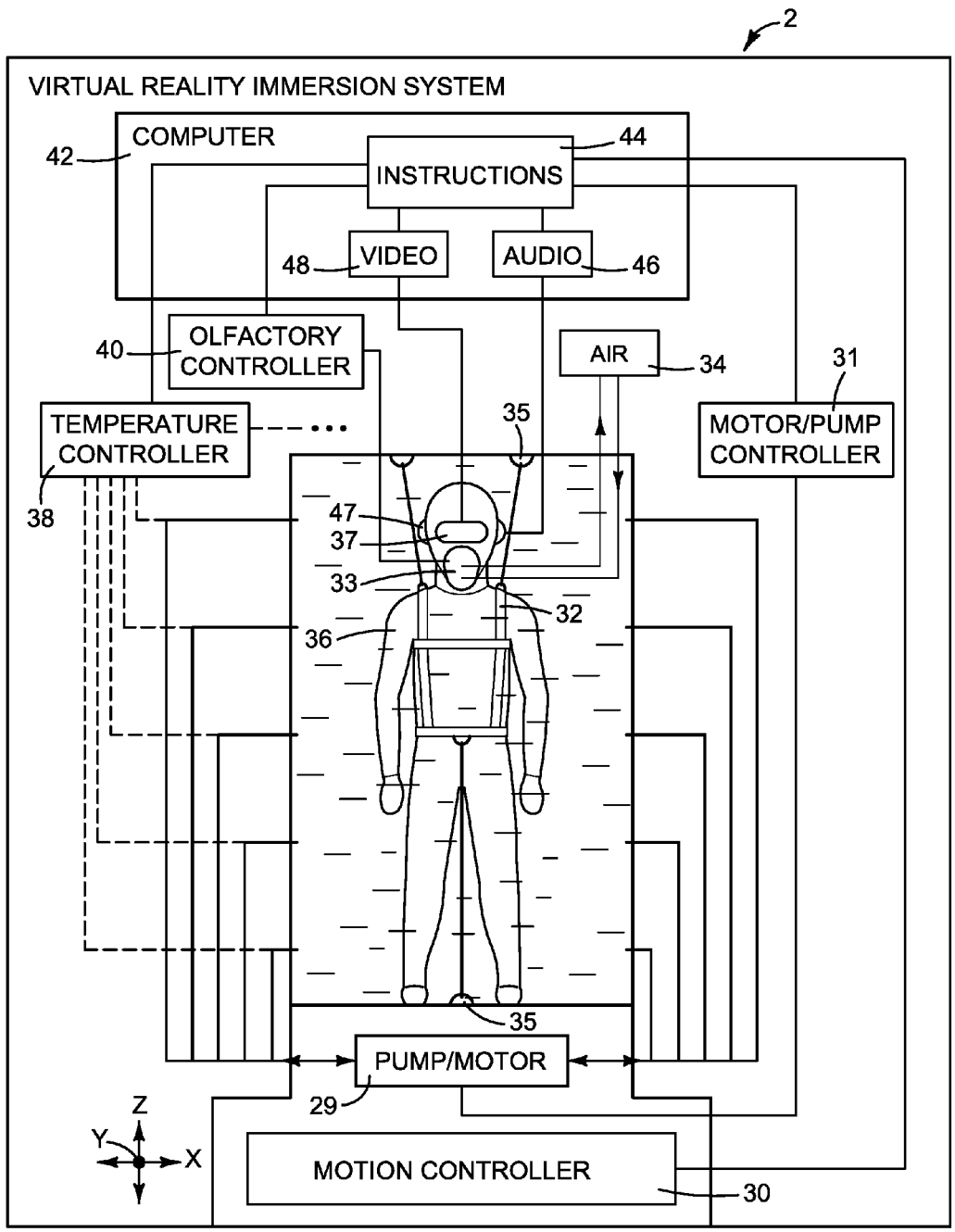
FIG. 2 is a diagram of an embodiment of the invention illustrating the interaction of various components of an exemplary embodiment of the disclosed invention.

FIG. 2 illustrates a diagram of a user 36 within the virtual reality enhancement device. The user is outfitted with an ocular mask 37 that provides the user with a 3D optical and potentially an auditory environment coinciding with the optical 3D environment. The user is provided with air to breath, including oxygen, as well as potentially any virtual reality enhancement additives via one or more conduits 34 or controllers 40. These virtual reality enhancement additives can constitute, for example but not limited to, increased percentage of oxygen in the breathing air, olfactory chemicals to increase a user's olfactory senses. These olfactory senses can include for example, fragrances or other hormones that will increase the user's sensory experience. Similarly, chemicals or other substances may be added to the inflow or outflow of the fluid in order to enhance the user's sensory experience.

FIG. 2 illustrates that in a preferred embodiment the user is suspended by a harness 32 that is attached to the chamber at anchor points 35. In a preferred embodiment, the chamber system is controlled by a computer 42 which issues instructions to the video 48, audio 46, olfactory 40, and temperature control 38 of the water that is pumped via pump/motor 29 in and out of the system. The computer operates in coordination with the motor controller 30 to coordinate the 3D interactive environment presented by the system with feedback generated by the motions of the user in combination with the user's physical attributes. These physical attributes including, heart rate, blood pressure which would indicate the user's excitement level can be utilized for the control of system.

Figure 3:
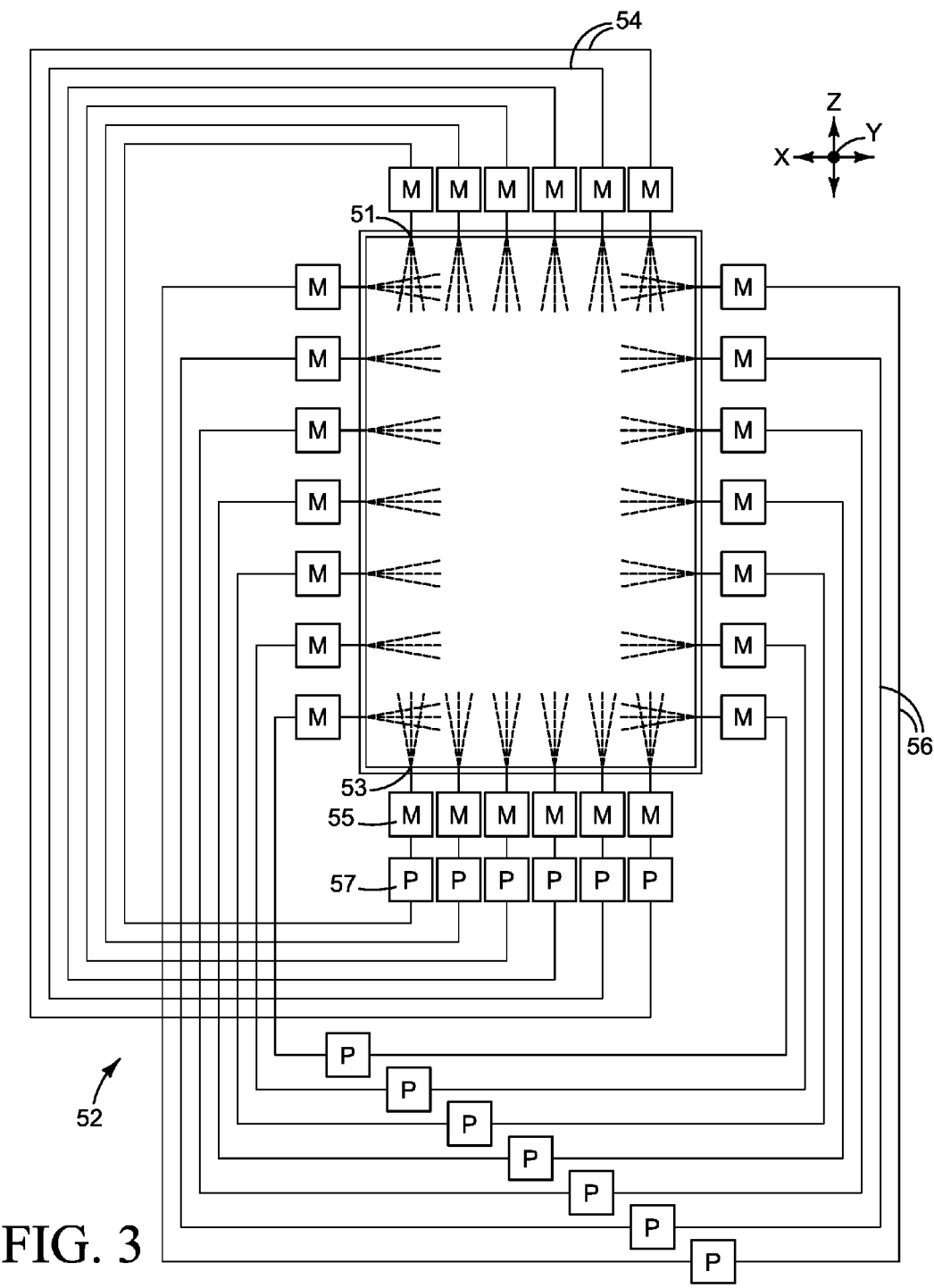
FIG. 3 is a diagrammatic side section showing six vertical circuits and seven laterally arrayed horizontal circuits

FIG. 3 is a diagram of the water flow schematics of a preferred embodiment of the 3D immersive system. In a preferred embodiment, the system has a plurality of water circuits that pump in a variety of directions determined by the orientation of the chamber. In the depicted embodiment of a rectangular chamber having four sides, the circuits that affect the vertical flow of water 54 are illustrated as a separate circuit for each opposing water portal, such as a vertical portal 51 and vertical portal 53. Each of the portals can be constructed to have a separate motor 55 and pump 57 for each of the vertical portals can utilize a single pump with a plurality of separately controllable portals to direct the individual water flow. Similarly, in the depicted embodiment seven horizontal circuits are depicted each with a separate pump and motor. Each of these individual circuits can also include a temperature control or alternatively, the temperature control can be located before or after the pump.

Figure 4:
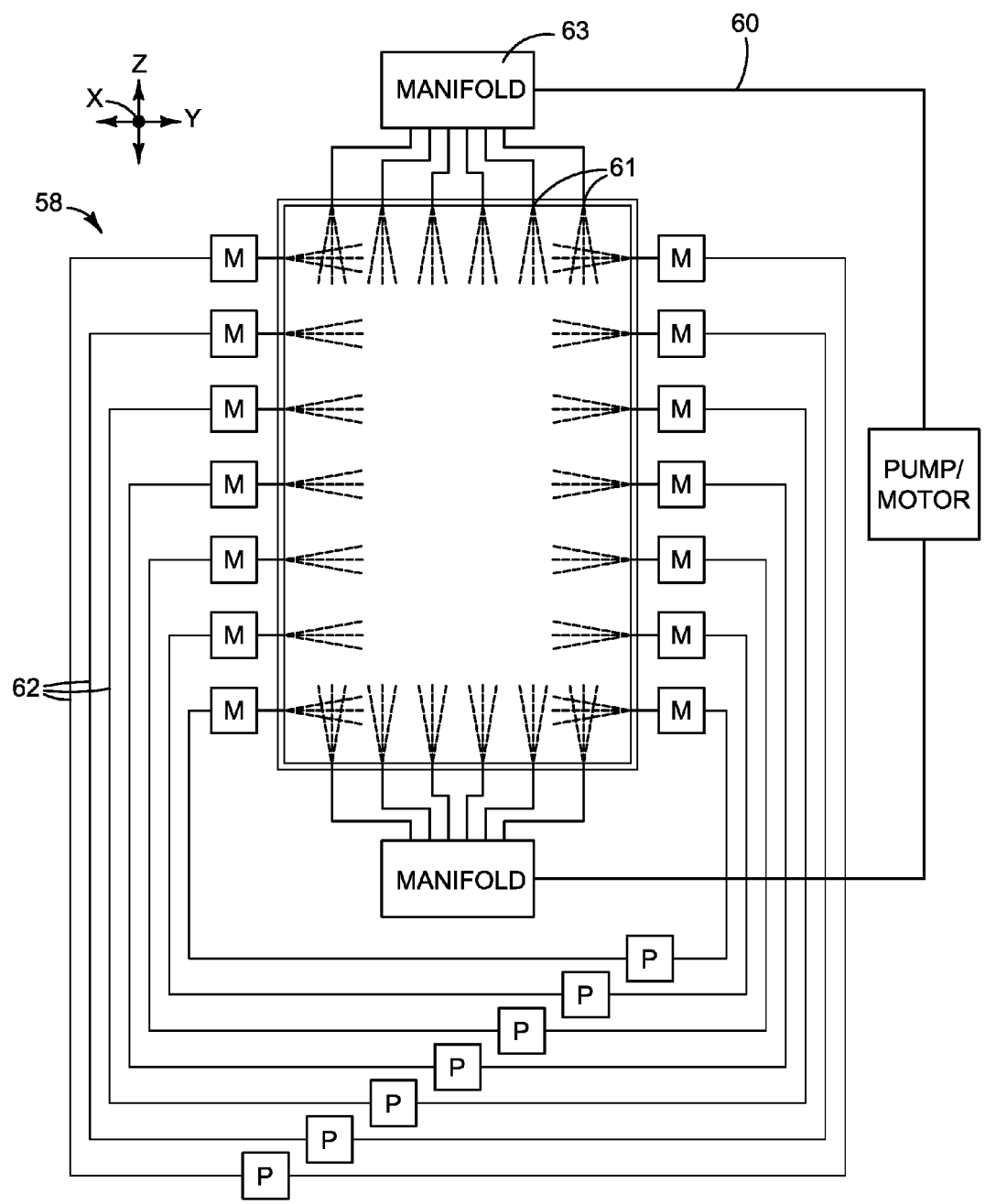
FIG. 4 is a diagram of the tank of FIG. 3 rotated 90 degrees showing one vertical circuit and seven horizontal circuits.

FIG. 4 illustrates an alternative circuit diagram 58 in which a series of horizontal as viewed from above. In FIG. 4, seven horizontal circuits are demonstrated each with a separate pump and manifold to direct one or more portals for the inflow and outflow of water or other fluid. In the preferred embodiment the pump can direct the flow of fluid to a manifold which distributes the flow of fluid to separate portals 61. The manifold can be configured to be in interaction with the computer and/or controls of the system. This will allow the manifold to selectively operate individual portals in order to generate separate water flow or feeling of different currents within the system.

Figure 5:
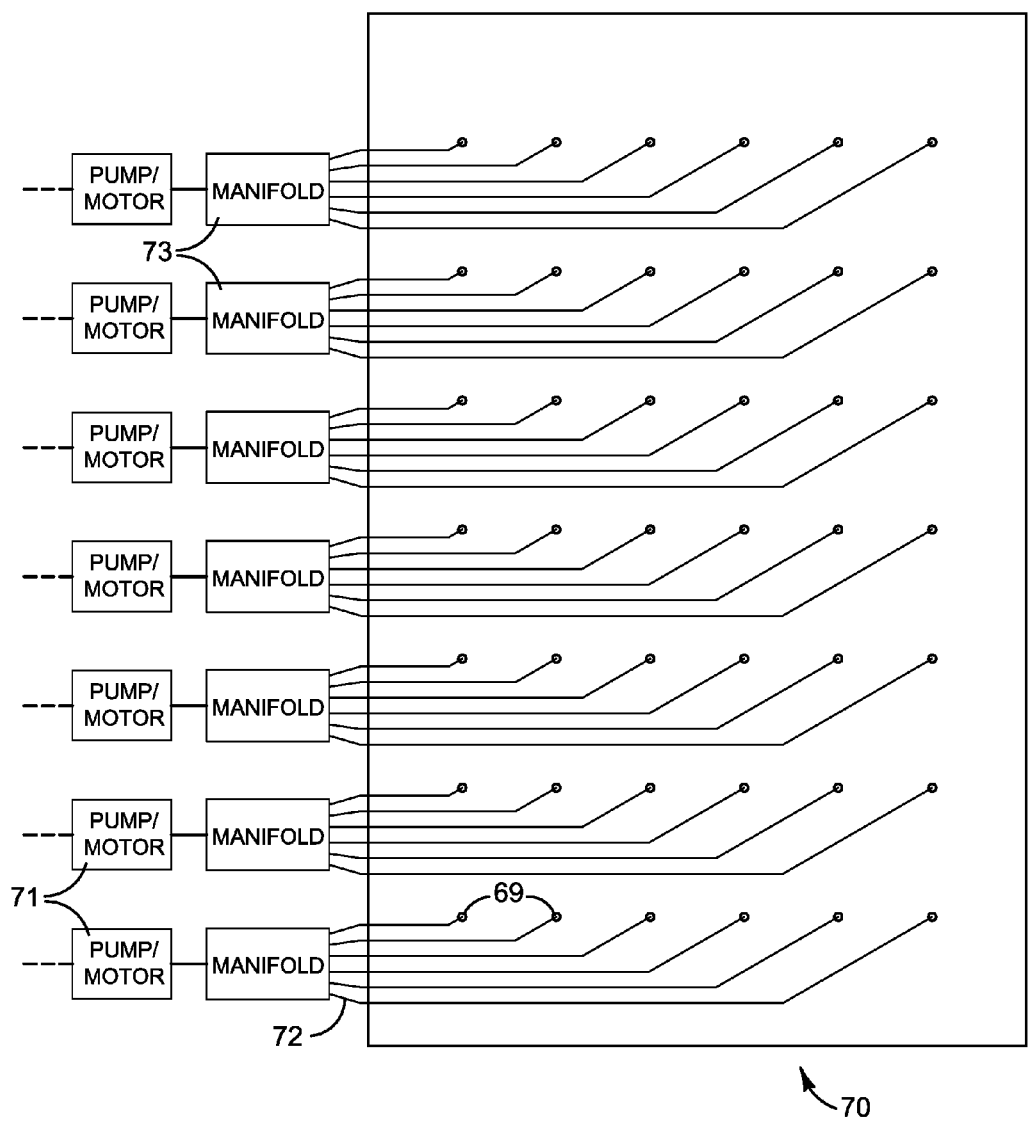
FIG. 5 is a side view diagram of the tank illustrating seven partial laterally arrayed horizontal circuits.

FIG. 5 illustrates a partial view laterally arrayed horizontal circuits. FIG. 5 illustrates that on a given side panel of the chamber, portals 69 are arranged generally at intervals that are engineered to provide varying fluid flow to the user within the chamber. These portals are provided with fluid via conduits 72 that are distributed at the manifold 73. Fluid is pumped via the pump or motor to the manifold where it is distributed selectively to the varying outlets 69 via conduit or tubing 72.

Figure 6:
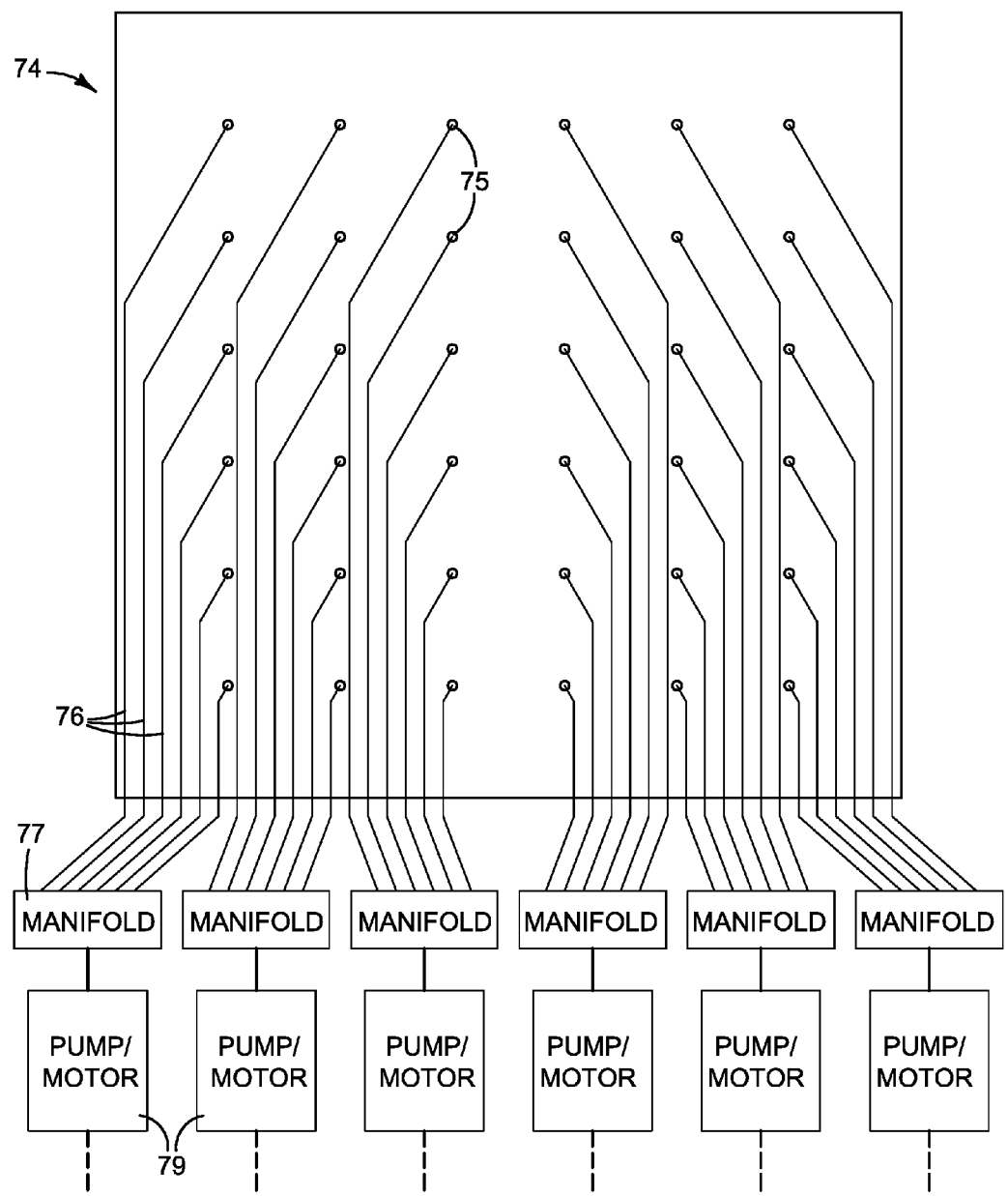
FIG. 6 is a top view of an embodiment of the chamber according to the described invention showing six vertical circuits.

FIG. 6 depicts a top panel of a rectangular chamber. Similar to the horizontal chamber the orientation of the top panel 74 comprises portals 75 aligned to provide varying water flow to a user within the chamber. The portals are in fluid connection with a manifold via conduit or tubing 76 that is fluidly connected to manifold 77. Pump or motor 79 directs water in the circuit to or from the portals.

Figure 7:
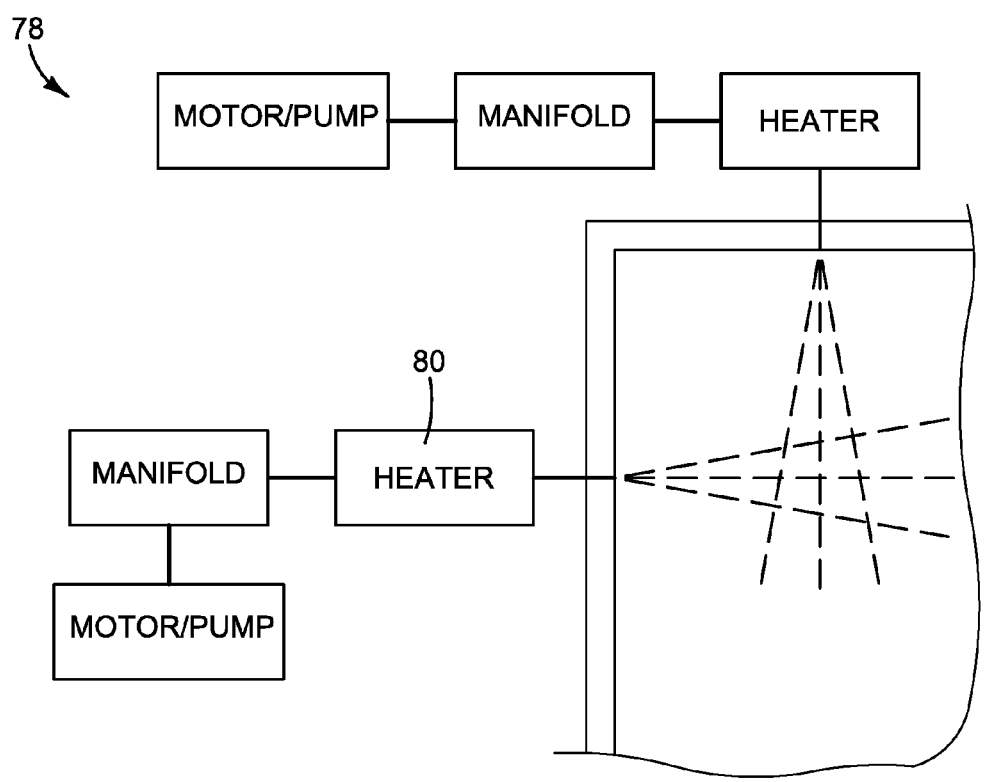
FIG. 7 illustrates a side detail of a circuit for water flow including a heater according an embodiment of the current invention.

FIG. 7 illustrates a preferred embodiment of the invention in which fluid temperature is controlled by a heater or cooler 80. The heater or cooler can be placed in the circuit either directly before or after the manifold and/or the motor or pump. The heater provides for varying water temperature to simulate cooler or hotter conditions to a user.

Figure 8:
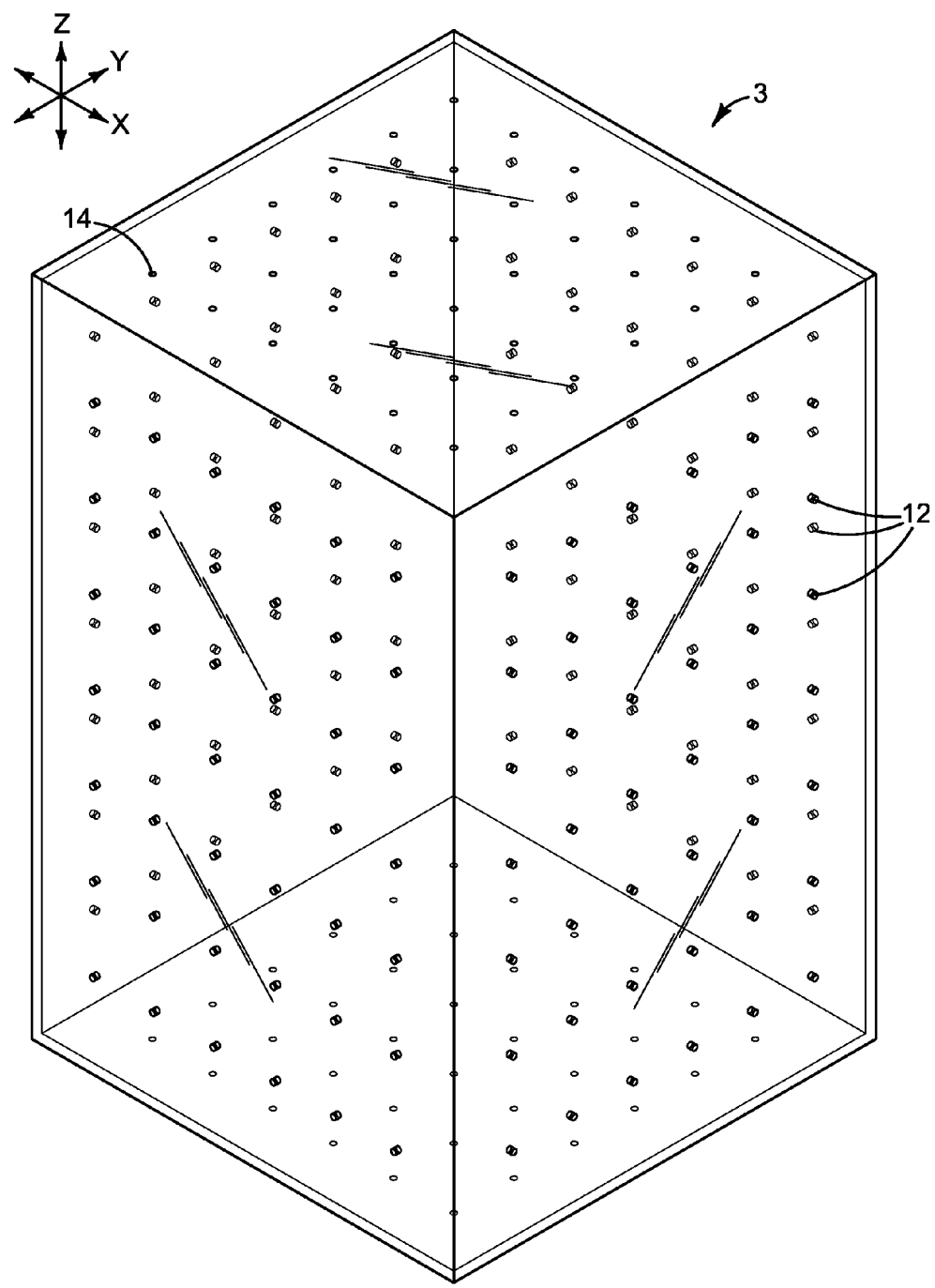
FIG. 8 is an isometric view of a transparent tank according to an embodiment of the invention.
Figure 9:
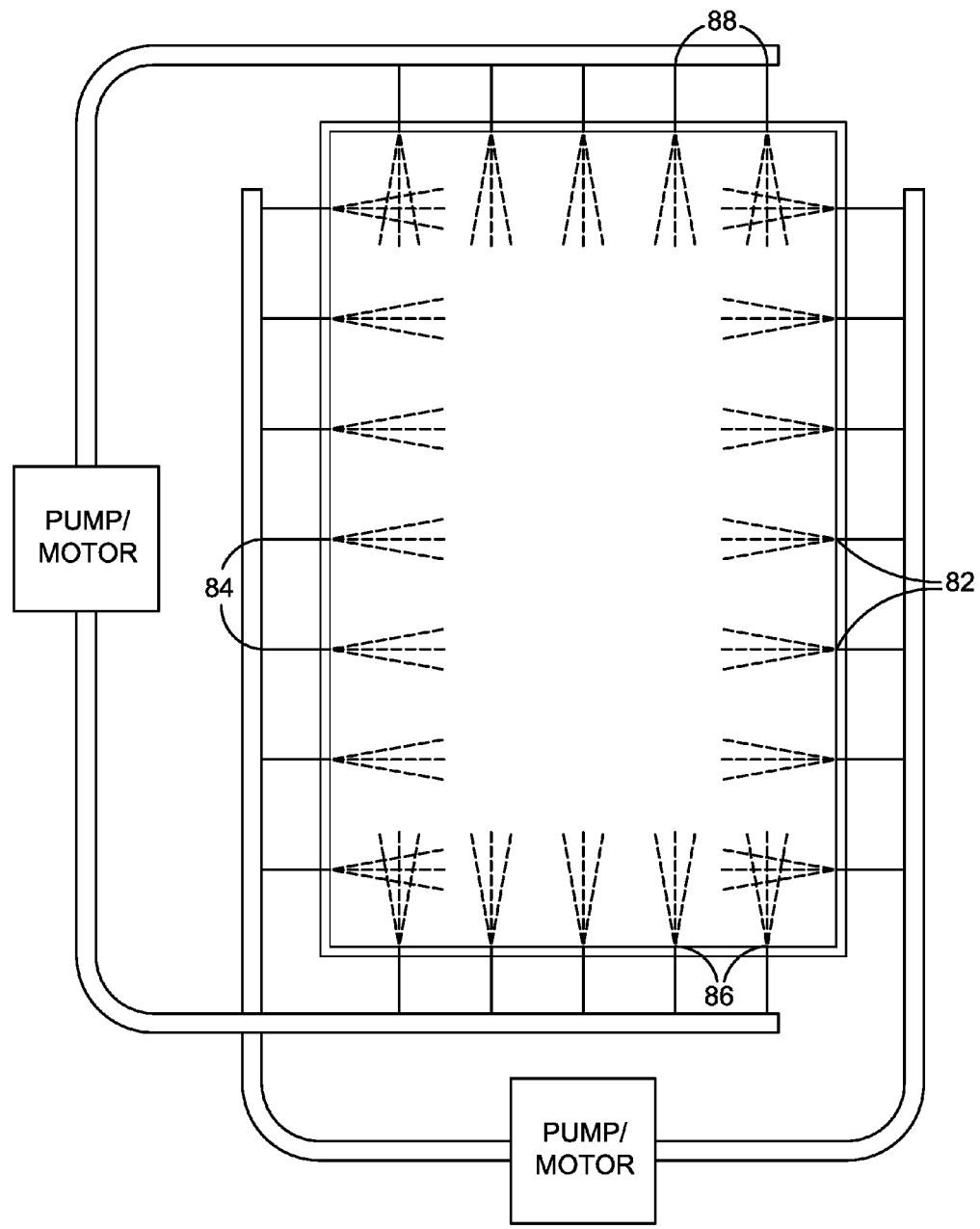
FIG. 9 is a depiction of a preferred embodiment of the invention illustrating an alternative embodiment in which the lateral jets are arrayed vertically as opposed to horizontally.

FIG. 8 depicts a transparent asymmetric view of the tank. The transparent view illustrates a plurality of portals 12 located on each side of the chamber 5. The portals 12, 14 for inflow and outflow of fluid in the chamber FIG. 9 illustrates two circuits in which the virtual reality enhancement device provides water flow into and out of the chamber. The individual ports are opposing such that water flow can be altered in various directions of the opposing ports. When the horizontal ports 82, 84 are operated in coordination with the vertical ports 86, 88 the virtual reality chamber can be utilized to generate water flow that gives the user a feeling that water is flowing along any of the three x, y, or z axes or in a combination thereto. This allows a user to feel the simulation that the user is swimming, for example in the ocean or that the user is flying.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A virtual reality enhancement device configured to implement actual physical applications so as to simulate 3-D environments in conjunction with a 3-D ocular device, said virtual reality enhancement device comprising:
   a chamber, wherein said chamber comprises a closable opening for human ingress and egress, wherein said chamber is configured to be fluid-tight when said closable opening is closed;
   at least one port configured for fluid inflow and at least one port configured for fluid outflow;
   a pump, wherein said pump is configured to pump a fluid into said chamber;
   an ocular device configured for providing a user with a 3-D interactive optical environment; and
   a processor configured for coordinating the operation of said 3-D optical environment and said pump in order to provide a user with an interactive 3-D haptic experience.

2. The virtual reality enhancement device of claim 1, wherein said chamber is configured in a rectangular box, wherein said chamber comprises ports on each interior surface of said box, wherein said ports are in fluid connection with said pump.

3. The virtual reality enhancement device of claim 2, wherein said rectangular box chamber comprises the dimensions of approximately 11 feet in height, approximately 7 feet in width, and approximately 7 feet in depth.

4. The virtual reality enhancement device of claim 1, wherein said pump is configured to circulate fluid into and out of said chamber to simulate flowing water.

5. The virtual reality enhancement device of claim 1, wherein said virtual reality enhancement device comprises a fluid temperature regulator configured for increasing and decreasing the temperature of said fluid.

6. The virtual reality enhancement device of claim 1, wherein said ocular device comprises a breathing mechanism attached to said ocular device, wherein said breathing mechanism is configured to provide said user with breathable air.

7. The virtual reality enhancement device of claim 1, wherein said ocular device comprises a virtual reality headset.

8. The virtual reality enhancement device of claim 1, wherein said device comprises a plurality of pumps configured to pump fluid into and out of said chamber.

9. The virtual reality enhancement device of claim 1, wherein said device is configured to simulate a swimming environment.

10. The virtual reality enhancement device of claim 1, wherein said device comprises at least one sensor for providing feedback from said user's actions to said processor.

11. The virtual reality enhancement device of claim 1, wherein said virtual reality enhancement device is configured to simulate a user flying.

12. A method of producing an interactive 3-D interface facilitating a user to implement actual physical applications so as to simulate 3-D environments in conjunction with a haptic device, said method comprising the following steps:
   the step of providing a chamber filled with a fluid, wherein said chamber is configured such for a human is able to be fully immersed within said chamber in said fluid, wherein said chamber comprises at least one fluid inflow port and at least one fluid outflow port, wherein said fluid inflow port and said fluid outflow port are fluidly connected to at least one pump configured for pumping fluid into and out of said chamber through said fluid inflow port and said fluid outflow port;
   the step of positioning a user within said chamber;
   the step of providing said user with an interactive virtual reality environment;
   the step of sealing said chamber to make said chamber water-tight;
   the step of manipulating the fluid inflow and outflow within said chamber so as to change the fluid flow within said chamber to correspond with the 3-D environment presented to said user in said chamber.

13. The method of claim 12, wherein said step of providing said user with an interactive virtual reality environment comprises the step of providing a virtual reality capable headset to said user, wherein said headset comprises a mechanism for displaying an interactive 3-D environment to said user.

14. The method of claim 12, wherein said method comprises the step of providing said user with a source of oxygen for said user to utilize for breathing.

15. The method of claim 14, wherein said step of providing said user with a source of oxygen comprises providing said user with a source of oxygen wherein said oxygen source comprises a mechanism by which virtual reality enhancement substances can be added to said oxygen supply to enhance said user's virtual reality experience.

16. The method of claim 14, wherein said method comprises the step of adding at least one virtual reality enhancement substance to said user's oxygen supply, wherein said substances are selected from the group consisting of mood enhancement substances and olfactory enhancement substances.

17. The method of claim 12, wherein said step of providing said chamber comprises providing a chamber with inflow and outflow ports configured in said chamber such that said chamber provides inflow and outflow of fluid ports generally surrounding said user.

18. The method of claim 12, wherein said step of manipulating the fluid inflow and outflow within said chamber comprises providing fluid inflow and outflow to simulate conditions in which a user positioned in said chamber is in the act of swimming.

19. The method of claim 12, wherein said method comprises the step of providing a chamber comprises providing a chamber comprising a rectangular box, wherein said rectangular box is approximately 11 feet in height, approximately 7 feet wide, and approximately 7 feet in depth.

20. The method of claim 12, wherein said step of manipulating the fluid inflow and outflow within said chamber so as to change the fluid flow within said chamber to correspond with the 3-D environment presented to said user in said chamber comprises using a processor configured to manipulate said fluid inflow and outflow within said chamber so as to change the fluid flow within said chamber to correspond with the 3-D environment presented to said user in said chamber to manipulate the fluid inflow and outflow within said chamber so as to change the fluid flow within said chamber to correspond with the 3-D environment presented to said user in said chamber.

\* \* \* \* \*